United States Patent

Zakikhani et al.

[11] Patent Number: 5,571,288
[45] Date of Patent: Nov. 5, 1996

[54] FLAME-RETARDANT TREATMENT OF FABRICS

[75] Inventors: Mohsen Zakikhani, Kidderminster; Xiao P. Lei, Shelly Oak, both of England

[73] Assignee: Albright & Wilson UK Limited, Warley, England

[21] Appl. No.: 467,611

[22] Filed: Jun. 6, 1995

[30] Foreign Application Priority Data

Jun. 22, 1994 [GB] United Kingdom ............... 9412484

[51] Int. Cl.⁶ .................................................. D06M 11/68
[52] U.S. Cl. ........................ 8/127.1; 8/115.7; 8/181; 8/188; 8/196; 8/115.64; 8/115.65; 8/115.69; 427/337; 427/341; 427/342; 427/379; 427/381; 427/382
[58] Field of Search ................... 8/115.7, 181, 188, 8/194, 195, 196, 120, 116.1, 127.1, 115.56, 115.64, 115.65, 115.69; 106/18.14, 18.15, 18.16, 18.18, 18.19, 18.21; 57/904; 427/337, 341, 342, 379, 381, 382

[56] References Cited

U.S. PATENT DOCUMENTS

| | | | |
|---|---|---|---|
| 3,860,439 | 1/1975 | Wagner | 427/337 |
| 4,078,101 | 3/1978 | Cole | 427/341 |
| 4,909,805 | 3/1990 | Smith | 8/127.1 |
| 5,468,545 | 11/1995 | Fleming et al. | 428/259 |
| 5,480,458 | 1/1996 | Fleming et al. | 8/115.58 |

FOREIGN PATENT DOCUMENTS

| | | |
|---|---|---|
| 470640 | 2/1992 | European Pat. Off. . |
| 1439608 | 8/1973 | United Kingdom . |
| 2271787 | 4/1994 | United Kingdom . |

*Primary Examiner*—Prince Willis, Jr.
*Assistant Examiner*—Alan D. Diamond
*Attorney, Agent, or Firm*—Frishauf, Holtz, Goodman, Langer & Chick, P.C.

[57] ABSTRACT

In the flame-retardant treatment of fabrics, there is provided a means for increased "loading" of phosphorus compounds (up to 25% moisture is retained after impregnation and drying of the fabric). This in turn enables a phosphonium compound "add-on" of 50% to 73% (relative to the weight of the fabric) and gives a correspondingly higher degree of flame-retardant properties.

20 Claims, No Drawings

FLAME-RETARDANT TREATMENT OF FABRICS

This invention relates to an improved method of treating fabrics to impart flame-retardant properties thereto and to fabrics made by means of that method.

A known process for the flame-retardant treatment of fabrics including cellulosic (e.g. cotton) fibres consists of impregnation of the fabric with an aqueous solution of a poly(hydroxyorgano)phosphonium compound, for example, a tetrakis(hydroxyorgano)phosphonium salt. Alternatively, the poly(hydroxyorgano)phosphonium compound may comprise a condensate with a nitrogen-containing compound such as urea. Following impregnation, the fabric is dried and then cured with ammonia to produce a cured, water-insoluble polymer which is mechanically fixed within the fibres of the fabric. After curing, the polymer is oxidised to convert trivalent phosphorus to pentavalent phosphorus and the fabric is washed and dried. Fabrics treated according to the aforesaid process and garments made from such treated fabrics are sold under the Registered Trade Mark PROBAN of Albright & Wilson Limited.

Hitherto, it has been the opinion of those skilled in the relevant art that the drying of the impregnated fabric prior to curing must be such that the dried impregnated fabric has a moisture content no greater than 18%, corresponding to an "add-on" of phosphonium compound of 40–44%. It has hitherto been found that where the moisture content exceeds 18%, migration of the cured phosphonium compound occurs, causing permanent staining of the fabric. Thus, the hitherto-perceived maximum of 18% moisture content has in turn imposed a maximum "add-on" of phosphonium compound and consequently an upper limit of the flame-retardant properties of the treated Fabric. For example, our published UK application GB-A-2271787 describes a method of imparting flame-retardant properties to fabric in which the 18% notional limit is not exceeded.

It has now been found, unexpectedly, that it is possible to dry the impregnated fabric to a moisture content of up to 25% without detrimental effect (especially without staining), thus enabling a higher "add-on" of phosphonium compound and hence a higher level of flame-retardant properties. The "add-on" of phosphonium compound in accordance with the present invention is in the range 50 to 73% relative to the weight of the fabric.

Accordingly, the present invention provides a method of treating fabrics to impart flame-retardant properties thereto, said method comprising the following stages:
(a) impregnating the fabric with an aqueous solution of a poly(hydroxyorgano) phosphonium compound;
(b) drying the impregnated fabric to a residual moisture content in the range 13 to 25%;
(c) curing the dried impregnated fabric with ammonia to produce a cured, water-insoluble polymer which is mechanically fixed within the fibres of the fabric;
(d) batching the fabric for at least one hour prior to oxidation;
(e) oxidising the cured polymer to convert trivalent phosphorus to pentavalent phosphorus;
(f) washing and drying the fabric.

The present invention also provides a fabric having flame-retardant properties, treated by the method described in the immediately-preceding paragraph.

The poly(hydroxyorgano)phosphonium compound may consist essentially of a tetrakis(hydroxyalkyl)phosphonium salt.

Alternatively, the poly(hydroxyorgano)phosphonium compound may comprise a condensate of a tetrakis(hydroxyalkyl)phosphonium salt with a nitrogen-containing compound.

A suitable phosphonium salt is tetrakis(hydroxymethyl)phosphonium chloride. The nitrogen-containing compound may be, for example, urea.

Preferably, the drying of the impregnated fabric, in stage (b), may be to a residual moisture content in the range 17 to 23%.

Oxidation, in stage (e), may suitably be carried out in the presence of a wetting agent, by means of hydrogen peroxide. The amount of hydrogen peroxide used for the oxidation may be up to 25% relative to the weight of the fabric. Suitably, the wetting agent is used in an amount of about 2 g/liter of oxidation bath.

The "add-on" of the phosphonium compound, after stage (a), is in the range 50 to 73%, relative to the weight of the fabric.

The fabric to be treated according to the present invention may consist essentially of cellulosic (e.g. cotton) fibres.

Alternatively, the fabric may comprise both cellulosic and non-cellulosic fibres. Examples of non-cellulosic fibres which may be used include polyamide fibres, acrylic fibres, aramid fibres, polyester fibres and polybenzimidazole fibres.

A suitable fabric for treatment according to the present invention is one comprising 60% cotton fibres and 40% polyester fibres.

In accordance with another embodiment of the present invention, one or more protonated and neutralised primary, secondary or tertiary aliphatic amines may be added to the impregnating solution, as disclosed in GB-A-2271787.

The present invention will be illustrated, merely by way of example, as follows: EXAMPLE 1

A black, 100% cotton fabric of weight 280 g/m$^2$ was treated by impregnation with an aqueous solution containing a precondensate of tetrakis(hydroxymethyl)phosphonium chloride and urea, together with protonated and neutralised amines according to GB-A-2271787. (In some comparative treatments, the protonated and neutralised amines were omitted; the presence or absence of these is indicated in the data as "ITC 628/yes/no").

The processing conditions were as follows:

| | |
|---|---|
| dry temperature set | 120° C. |
| ammonia cure conditions (× 2) | |
| flow rate | 53 liters/min |
| Pressure | 23 PSI |
| dwell time | 21.7 sec. |

1.1 Simulated Continuous Oxidation

| Oxidation conditions | |
|---|---|
| $H_2O_2$ conc. | X% (w/w) (see tables) |
| fabric dip | one end |
| fabric airing | one end |
| Neutralization conditions | |
| $Na_2CO_3$ conc. | 20 g/litre |
| fabric dip | 4 ends |

Detergent washing was conducted in the Jig using a bath containing 3 g/liter of $Na_2CO_3$ and 2 g/liter of WA 100* at 60° C. for 4 ends.

Sodium metabisulphite washing was again carried out in the Jig. The bath contained 5 g/liter soda ash, 2 g/liter WA 100* and 10 g/liter sodium metabisulphite; at 60° C. for 3 ends.

Hot rinsing was carried out at 60° C. for 4 ends and cold rinsing was carried out in the Jig.

\* WA100 is a wetting agent believed to consist essentially of alkyl polyglycol ethers.

The processing conditions for individual fabric samples are given in TABLE I (below) and the phosphorus and nitrogen content of the fabric, both after finishing and after durability testing, together with the results of flame-retardancy testing, are given in TABLE II (below).

TABLE I

| FABRIC SAMPLE CODE | ADD-ON OF PHOSPHONIUM CPD (%) | ITC 628 YES/NO | $H_2O_2$ CONCN. (V/V) | $H_2O_2$ CONCN. (W/W)* | RESIDUAL MOISTURE CONTENT (%) | DRY ADD-ON (%) |
|---|---|---|---|---|---|---|
| 941A | 50.0 | YES | 43% | 29% | 19–21% | 21.8% |
| 942A | 50.0 | YES | 43% | 29% | 19–21% | 23.0% |
| 943A | 50.0 | NO | 43% | 29% | 21–23% | 22.3% |
| 944A | 50.0 | NO | 43% | 29% | 21–23% | 22.9% |
| 941B | 55.2 | YES | 36% | 29% | 19–21% | 26.9% |
| 942B | 55.2 | YES | 36% | 29% | 19–21% | 27.0% |
| 941C | 54.3 | YES | 35% | 35% | 18–22% | 25.7% |
| 942C | 54.3 | YES | 35% | 35% | 18–22% | 25.7% |
| 945 | 70.5 | NO | 60% | 35% | 15–16% | 35% |

*Each oxidising bath contained 2 g/liter wetting agent.

All the above processing gave "clear" fabrics, i.e. without surface staining by migration of the cured phosphonium compound.

TABLE II

| FABRIC SAMPLE | as finished | | after durability | | FR results | |
|---|---|---|---|---|---|---|
| CODE | P% | N% | P% | N% | DIN(a) | NFG(b) |
| 942A | 3.20 | 3.06 | 3.14 | 3.09 | pass | pass |
| 944A | 3.28 | 3.15 | 3.07 | 2.98 | pass | pass |
| 942B | 3.52 | 3.51 | 3.27 | 3.24 | pass | pass |
| 945 | 4.39 | 4.26 | 4.09 | 4.06 | pass | pass |

(a) DIN 66083 S-b
(b) NFG 07-184

1.2 Jig oxidation

The processing conditions were the same as in 1.1. (above) except for the oxidation conditions:

| H2O2 conc; | x% (w/w) (see tables) |
|---|---|
| Ends | 3 |
| batch time | 3 min |

The results are given in Tables III and IV (below).

TABLE III

| FABRIC SAMPLE CODE | ADD-ON OF PHOSPHONIUM CPD (%) | ITC 628 YES/NO | $H_2O_2$ CONCN. (V/V) | $H_2O_2$ CONCN. (W/W)* | RESIDUAL MOISTURE CONTENT (%) | DRY ADD-ON (%) |
|---|---|---|---|---|---|---|
| 941D | 43.8 | NO | 10% | 29% | 13–14 | 23.1 |
| 942D | 43.8 | NO | 10% | 29% | 13–14 | 23.0 |
| 941E | 44.3 | YES | 10% | 29% | 13–14 | 21.0 |
| 942E | 44.3 | YES | 10% | 29% | 13–14 | 20.8 |
| 943C | 54.8 | YES | 15% | 29% | 19–21 | 27.6 |
| 944C | 54.8 | YES | 15% | 29% | 19–21 | 27.7 |
| 941F | 51.7 | YES | 15% | 35% | 18–19 | 26.6 |
| 942F | 51.37 | YES | 15% | 35% | 18–19 | 26.7% |

*Each oxidising bath contained 2 g/litre wetting agent.

All the above processing gave "clear" fabrics, as in 1.1. (above)

TABLE IV

| FABRIC SAMPLE | as finished | | after durability | | FR results | |
|---|---|---|---|---|---|---|
| CODE | P% | N% | P% | N% | DIN(a) | NFG(b) |
| 942D | 2.99 | 2.93 | 2.85 | 2.84 | pass | pass |
| 942E | 3.08 | 2.99 | 2.98 | 2.95 | pass | pass |
| 943C | 3.58 | 3.58 | 3.41 | 3.38 | pass | pass |
| 942B | 3.52 | 3.51 | 3.27 | 3.24 | pass | pass |
| 941F | 3.69 | 3.59 | 3.11 | 3.07 | pass | pass |
| 942F | 3.75 | 3.74 | 3.45 | 3.34 | pass | pass |

(a) DIN 66083 S-b
(b) NFG 07-184

EXAMPLE 2

The process of Example 1 (above) was carried out on a sateen weave fabric comprising 60% cotton fibres and 40% polyester fibres, without the addition of the protenated and neutralised amines, i.e. "ITC 628:no".

2.1 Effect of peroxide concentration on surface staining

Hydrogen peroxide of 35% w/w strength was used and the results are given in TABLE V (below):

TABLE V

| FABRIC SAMPLE CODE | $H_2O_2$ CONC (W/W)* | ADD-ON OF PHOSPHONIUM CPD (%) | RESIDUAL MOISTURE CONTENT (%) | SURFACE STAINING |
|---|---|---|---|---|
| 943D | 3.5 | 48.6 | 18–20 | YES |
| 944D | 3.5 | 48.6 | 18–20 | YES |
| 941G | 10.0 | 48.9 | 17–19 | a little |
| 942G | 10.0 | 48.9 | 17–19 | a little |
| 943D | 18.0 | 48.8 | 18–20 | none |
| 944D | 18.0 | 48.8 | 18–20 | none |

*Each oxidation bath contained 2 g/litre wetting agent.

2.2 Effect of batching on surface staining

Hydrogen peroxide of 35% w/w strength was again used, but the fabric was batched for 3 hours prior to oxidation. The results are given in TABLE VI (below):

TABLE VI

| FABRIC SAMPLE CODE | $H_2O_2$ CONC (W/W)* | BATCH TIME (HRS) | ADD-ON OF PHOSPHONIUM CPD (%) | RESIDUAL MOISTURE CONTENT (%) | SURFACE STAINING |
|---|---|---|---|---|---|
| 943D | 3.5 | — | 48.6 | 18–20 | HEAVY |
| 944D | 3.5 | — | 48.6 | 18–20 | HEAVY |
| 942H | 3.5 | 3 | 48.6 | 18–20 | NONE |
| 942J | 3.5 | 3 | 48.1 | 18–20 | NONE |

*Each oxidising bath contained 2 g/litre wetting agent.

EXAMPLE 3

In further example, a 1000 m length of a twill fabric comprising 60% cotton fibres and 40% polyester fibres and having a weight of 315 g/m² was treated in accordance with the present invention.

The processing conditions are shown in TABLE VII (below):

| FABRIC SAMPLE CODE | ADD-ON OF PHOSPHONIUM (%) | ITC 628 CPD YES/NO | $H_2O_2$ CONC. (V/V) | $H_2O_2$ CONC. (W/W)* | RESIDUAL MOISTURE CONTENT (%) | % P | % N |
|---|---|---|---|---|---|---|---|
| 694A | 53 | NO | 46 | 50 | 25 | 3.33 | 3.54 |
| 694B | 53 | YES | 46 | 50 | 25 | 3.51 | 3.66 |

*Each oxidising bath contain 2 g/litre wetting agent.

All the above processing Gave "clear" fabrics, i.e. without surface staining by migration of the cured phosphonium compound.

We claim:

1. A method of treating a fabric to impart flame-retardant properties thereto, said process comprising the following stages:

(a) impregnating said fabric with an aqueous solution of a poly(hydroxyorgano)phosphonium compound;

(b) drying said impregnated fabric to a residual moisture content of from 13% to 25%;

(c) curing said dried impregnated fabric with ammonia to produce a cured, water-insoluble, phosphorus-containing polymer which is mechanically fixed within the fibres of said fabric, (d) batching said cured dried impregnated fabric for at least one hour;

(e) oxidising said cured phosphorus-containing polymer to convert trivalent phosphorus to pentavalent phosphorus:

(f) washing and drying said fabric; and wherein, following stage (a), said fabric has an add-on of said phosphonium compound of from 50% to 73%, relative to the weight of said fabric.

2. The method of claim 1, wherein said poly(hydroxyorgano)phosphonium compound consists essentially of a tetrakis(hydroxyalkyl)phosphonium salt.

3. The method of claim 1, wherein said poly(hydroxyorgano)phosphonium compound comprises a condensate of a tetrakis(hydroxyalkyl)phosphonium salt and a nitrogen-containing compound.

4. The method of claim 3, wherein said nitrogen-containing compound is urea.

5. The method of claim 1, wherein said impregnated fabric is dried, in stage (b), to a residual moisture content in the range 17 to 23%.

6. The method of claim 5, wherein said tetrakis(hydroxyalkyl)phosphonium salt is tetrakis(hydroxymethyl)phosphonium chloride.

7. The method of claim 1, wherein said oxidising stage (e) is carried out by means of hydrogen peroxide, in the presence of a wetting agent.

8. The method of claim 7, wherein said hydrogen peroxide is used in stage (e) in an effective amount of up to 25%, relative to the weight of said fabric.

9. The method of claim 1, wherein said fabric to be treated consists essentially of cellulosic fibres.

10. The method of claim 9, wherein said fabric consists essentially of cotton fibres.

11. The method of claim 1, wherein said fabric to be treated comprises both cellulosic and non-cellulosic fibres.

12. The method of claim 11, wherein said non-cellulosic fibres are selected from the group consisting of polyamide fibres, acrylic fibres, aramid fibres, polyester fibres and polybenzimidazole fibres.

13. The method of claim 11, wherein said fabric comprises 60% cotton fibres and 40% polyester fibres.

14. The method of claim 1, wherein said aqueous solution also contains at least one primary, secondary or tertiary aliphatic amine, said at least one amine having been protonated and neutralised prior to being added to said solution.

15. The method of claim 1, wherein
said poly(hydroxyorgano)phosphonium compound consists essentially of a tetrakis(hydroxyalkyl)phosphonium salt or a condensate of a tetrakis(hydroxyalkyl)phosphonium salt and a nitrogen-containing compound.

16. The method of claim 15, wherein said tetrakis(hydroxyalkyl)phosphonium salt is used and is tetrakis(hydroxymethyl)phosphonium chloride.

17. The method of claim 15, wherein said oxidising stage (e) is carried out using hydrogen peroxide in an effective amount of up to 25%, relative to the weight of said fabric; in the presence of a wetting agent.

18. The method of claim 15, wherein said aqueous solution also contains at least one primary, secondary or tertiary aliphatic amine, said at least one amine having been protonated and neutralised prior to being added to said solution.

19. The method of claim 15, wherein said fabric to be treated consists essentially of cellulosic fibres or both cellulosic and non-cellulosic fibres.

20. The method of claim 15, wherein said fabric to be treated consists essentially of cotton fibres.

* * * * *